July 3, 1928.                                                    1,676,117
V. R. STENGER
INTERMITTENT MOVEMENT MECHANISM
Filed Jan. 11, 1926
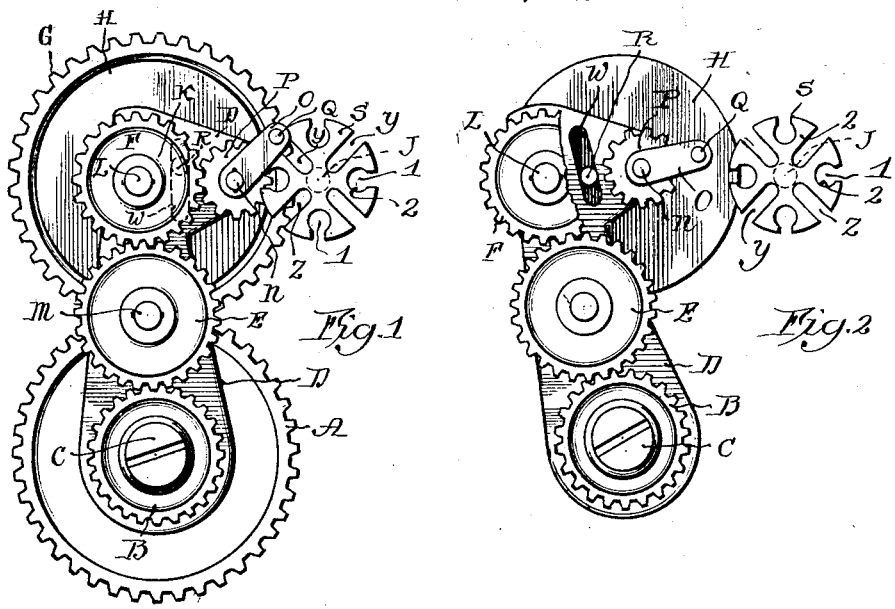
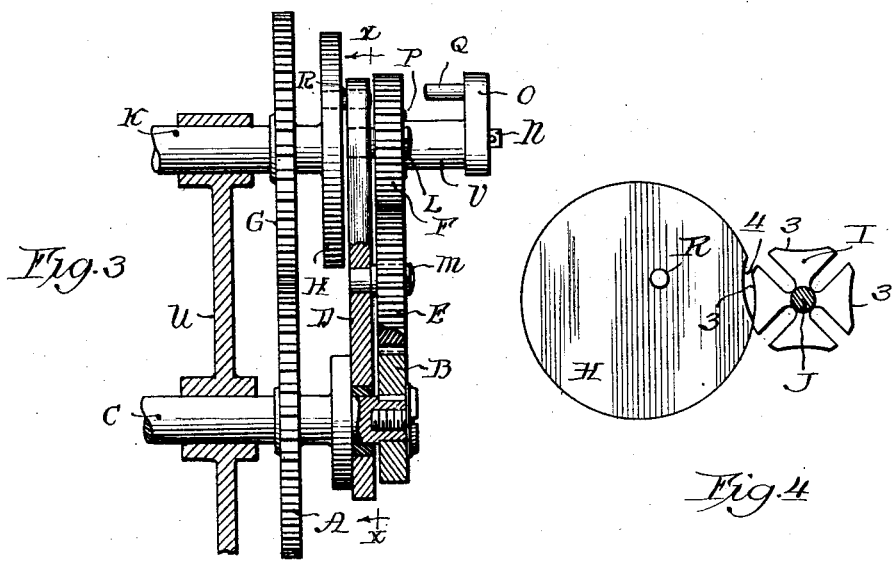
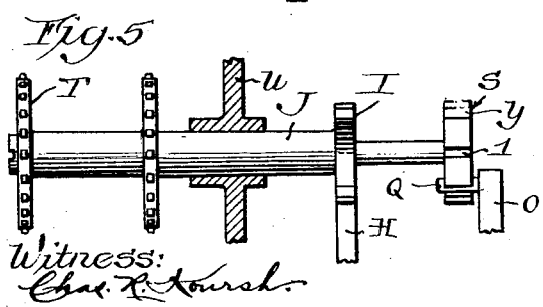
Inventor,
Victor R. Stenger,
By Walter A. Scott,
Atty Patented July 3, 1928.

1,676,117

UNITED STATES PATENT OFFICE.

VICTOR R. STENGER, OF CHICAGO, ILLINOIS.

INTERMITTENT-MOVEMENT MECHANISM.

Application filed January 11, 1926. Serial No. 80,394.

My invention is a mechanical movement for imparting an intermittent movement to a driven member from a constantly actuated driving member by means so arranged that, with a predetermined period of time for one cycle of movement and rest and a predetermined extent of movement, the time interval occupied by the movement may be diminished without imposing violent and injurious shock upon the apparatus, or upon material to which it imparts a feeding movement. The form of the apparatus shown in the drawings is designed for use in a motion picture camera or projector. In such apparatus it is necessary that the film be moved step-by-step and that it be held stationary between the successive steps of movement. The time occupied in movement of the film serves no function other than permitting the movement to take place, and during the periods of movement the shutter of the camera or projector must be closed in order to prevent blurring the film in exposure or causing a blurred image upon the screen during projection. The shorter the time periods of movement and darkness can be made, the greater will be the time periods of rest for exposure in the camera and the time periods of rest and illumination during projection. This, of course, results in fuller exposure in the camera without decreasing the number of exposures per second, and likewise results in a more brilliantly illuminated image on the screen when the film is projected.

The most efficient and widely used mechanism heretofore used for imparting intermittent movement to motion picture film is the well-known Geneva movement, but the principle of operation of the Geneva movement is such that no decrease can be made in the time period of movement without correspondingly diminishing the time period of rest. If the Geneva movement is speeded up to shorten the periods of movement the periods of rest will be proportionately shortened, and the result is simply to increase the number of exposures per second without any alteration of the relation between the times occupied by movement and rest.

In the embodiment of my invention shown in the drawing, I employ the Geneva movement. Broadly speaking, my invention as applied in this form consists in means whereby I double the speed of rotation of the driving member of the Geneva movement, thereby shortening the time period of movement, but cause the driving member to engage the driven member only on every alternate revolution of the driving member thereby avoiding any increase in the number of movements per second imparted to the film. The time period of movement is thus cut in half and the time taken from the period of movement is added to the time period of rest. In the Geneva movement as heretofore used in motion picture machines the driving member engages the driven member upon every revolution of the driving member, and ninety degrees movement of the driving member imparts ninety degrees movement to the driven member, and the speed of the driving member is adjusted to secure the desired rapidity of exposure of the film either in the camera or projector. In my improved apparatus the rotating member which has the rotative speed of the driving member in apparatus now in use is not the driving member of the Geneva movement, but serves to impart rotation at double its own rotative speed to the driving member of the Geneva movement, which latter, as above stated, engages the driven member of the Geneva movement only on every alternate revolution. Thus the rotating member of my improved apparatus which rotates at the speed of the driving member of the Geneva movement as heretofore used imparts a step of movement to the film during forty-five degrees of its rotation instead of requiring ninety degrees as heretofore, and the periods of darkness and movement and of rest and illumination extend through forty-five degrees and three hundred-and-fifteen degrees respectively of the rotation of the rotary member of my apparatus which has the speed of the driving member of the Geneva movement as heretofore used instead of ninety degrees and two hundred-and-seventy degrees as is the case with the machines heretofore used wherein the driving member of the Geneva movement engages the driven member upon every revolution of the driving member. The result is that with my improved apparatus there is illumination and rest for seven-eighths of the time and darkness and movement only during one-eighth of the time in place of illumination and rest for three-quarters of the time and movement and darkness for one-quarter as is the case with the former use of the Geneva movement in motion picture apparatus.

In the drawings:—

Figure 1 is an elevation view of my apparatus as designed for a motion picture apparatus. The film reel, not shown in this view, is fixed on the shaft which carries the driven member or star wheel of the Geneva movement. In this view the driving and driven members of the Geneva movement are in engagement.

Figure 2 is a view similar to Figure 1, but showing the parts in the disengaged position of the driving and driven members of the Geneva movement.

Figure 3 is a view in a direction at a right angle to the direction of view in Figure 1, the driven member or star wheel of the Geneva movement being omitted.

Figure 4 is a fragmentary view on the plane of the dotted line X in Figure 3, looking in the direction of the arrow.

Figure 5 is a fragmentary plan view.

Referring first to Fig. 3, U is a fixed frame member of the machine in which the shafts C and K have bearings as shown. Power is applied to the shaft C. Intermeshing spur gears A and G are of the same radius and are fixed respectively to shafts C and K, whereby shaft K rotates at the same speed as shaft C. Rotatively mounted on shaft C is an upwardly extending arm or plate D, the rotative mounting of plate D permitting it to have an oscillatory movement with the shaft C as a center. Fixed to the outer end of shaft C is a spur gear B. Spur gears E and F are rotatively mounted on studs M and L which are carried by oscillatory plate D. Gears B and F are of the same radius and intermesh with intermediate gear E. Plate D being rotatively mounted on shaft C, to which shaft gear B is fixed, gears B, E and F remain in mesh in all of the oscillatory positions of plate D, and gear F is, therefore, constantly rotated at the same angular speed as shaft C. Rotatively mounted on a stud N carried by plate D is a spur gear P which is of one-half the radius of gear F and in mesh therewith. Gear P, therefore, has twice the angular velocity of gear F. Rigid with the gear P is an axially extending post V which carries at its outer end a radially extending crank arm O at the end of which is a pin Q. The gear P with its post V, arm O and pin Q forms the driving member of the Geneva movement.

As shown in Figures 1 and 5, the pin Q in certain positions of the mechanism engages with and actuates the driven member or star wheel S. The pin Q of the driving member is caused to engage the driven member S only upon alternate revolutions of the gear P, of which post V, arm O and pin Q form a part, by means of a stud R which projects from lock-wheel H, lock wheel H being fixed to shaft K and therefore revolving once for each two revolutions of gears P, which follows from the fact that gear F has the same rate of rotation as gear G, both being driven from and at the same rate as shaft C. The stud R engages a slot W in the plate D, whereby the rotation of lock-wheel H with its stud R imparts an oscillatory movement to plate D on shaft C as a center. The pin Q, carried by the gear P, is thus moved to and from a position where during its rotation it will engage the star wheel S. The form of the slot W may be varied to establish any desired relation between pin Q and star wheel S during the period of contact between them.

In Figure 1, the plate D is shown as nearly at the end of its movement toward the right and the pin Q is just entering one of the radial slots of the star wheel. The gear P is rotating clockwise and with it the pin Q, and the lock-wheel H carrying the stud R is rotating in the same direction. The pin Q thus approaches the star wheel both in its own rotary movement and in the movement of translation imparted to it by the oscillation of plate D. By the time the pin Q has carried the slot Y of the star wheel to the position occupied by the slot Z the plate D has commenced its movement toward the left. Thus the pin Q leaves the slot of the star wheel under both its own rotary movement and under the translatory movement imparted by the plate D. Inasmuch as the lock-wheel H revolves once while the pin Q revolves twice, when the pin Q next arrives at the rotatory position shown in Figure 1 the plate D will be in its left-hand position as shown in Figure 2, in which position the path of rotation of pin Q does not intersect the star wheel and the pin, therefore, completes its rotation without engaging or imparting movement to the star wheel. But upon the completion of one more rotation of the pin Q the plate D has again moved to the right and returned to the position shown in Figure 1, whereupon pin Q will again engage and impart a step of movement to the star wheel. By this means the pin Q of the driving member imparts movement to the star wheel only upon each alternate revolution of the driving member.

It will be apparent that a wide variety of means could be employed to impart oscillatory movement to the plate D, and that by suitably timing the movement of the plate D the pin Q could be made to engage the star wheel upon every third, or fourth revolution of the driving member, or once during any number of revolutions desired.

The movement imparted to the pin Q by the movement of plate D as pin Q enters the radial slot of the star wheel serves to make the initial acceleration of the star wheel less rapid and thus to diminish the shock incident to the engagement of the pin with star wheel, and the opposite movement of the plate D at the time the pin Q is leaving the slot makes the retardation of the star wheel at the end of its movement less sudden. The gentler acceleration and retardation of the star are important in that the shock upon the film is thus lessened and the life of the film is correspondingly increased. The shock upon the film can be further decreased by giving the notches, designated by the numeral 1, between the radial grooves of the star wheel such a form that a relatively thin body of metal is left at the point 2 contiguous to each of the radial slots. By so thinning the metal at each of the points 2 sufficient resiliency may be imparted to the part of the star wheel upon which pressure is exerted by the pin Q to permit a slight yielding under the impact of the pin. The force absorbed by such yielding decreases to that extent the shock communicated to the film when its movement is started. Inasmuch as the employment of the separate stop wheel I relieves the star wheel of any duty other than receiving the impulse of pin Q. The star wheel can be lightened to any extent consonant with the preservation of sufficient strength.

On the drawing, I have shown only sufficient of the mechanism of a motion picture apparatus to illustrate the application of my invention thereto. Figure 5 is a plan view showing the parts which are mounted on the shaft J which carries the driven member or star wheel of the Geneva movement. The shaft J is journaled in the frame member U of the machine. Fixed to the shaft J is the sprocket T, the teeth of which engage the perforations in the film. Also fixed to the shaft J is the stop member I of the Geneva movement. The stop member I is provided with four peripheral concave arcuate surfaces of the same radius as the periphery of the lock-wheel H, one of the surfaces 3 of the stop member fitting against the periphery of the lock-wheel during each period of rest. As usual in Geneva movements the lock-wheel H is provided with a notch 4 in its periphery which arrives opposite the star wheel contemporaneously with the initial contact of the pin Q therewith thus affording clearance for the rotation of the star wheel when subjected to the pressure of the pin Q. At the time the pin Q passes out of contact with the star wheel the circular part of the periphery of the lock wheel engages the next succeeding concave surface 3 of the star wheel and effectually locks the same against movement until the pin Q again comes into contact with the star wheel. It will be noted that the lock wheel H rotates at half the velocity of the pin Q and therefore holds the star wheel continuously locked during the entire idle revolution of the pin Q and during all of the succeeding revolution thereof with the exception of the period when the pin contacts the star wheel.

What I claim as my invention is:

1. An intermittent movement mechanism comprising a driven shaft carrying a wheel provided with a plurality of open-ended slots, means for periodically imparting to said wheel a step-by-step rotation embodying a pin adapted to enter the open end of each of said slots in succession, an oscillating arm carrying this pin, gearing on said arm for bodily rotating this pin to accomplish said step-by-step rotation of the driven wheel, means for shifting said pin during its body rotation first toward the edge of the driven wheel and then away from the edge of the driven wheel during its engagement in one of the slots of said wheel, whereby the starting as well as the stopping of the driven wheel is retarded.

2. An intermittent movement mechanism comprising a radially-slotted driven wheel, means for imparting to said wheel a step-by-step rotation embodying a pin adapted to enter each of said slots in succession, an oscillating arm carrying said pin, gearing on said arm for bodily rotating said pin, and devices for periodically imparting to said arm while the pin is thus bodily rotating a translatory relative movement with reference to said driven wheel in the plane of the rotation of said driven wheel between positions in which said pin engages in one of the slots of said driven wheel in its body movement and in which said pin misses engagement with said driven wheel.

3. An intermittent-movement mechanism comprising a driving-shaft carrying a gear and also a pinion, an oscillating arm carrying a train of gearing meshing with said pinion, the terminal gear in said train carrying a Geneva pin, a shaft carrying a Geneva wheel adapted to be operated by said pin and also a Geneva-lock-wheel, a driven shaft carrying a gear in mesh with the gear on the driving shaft and also carrying a notched lock-wheel adapted to act with the aforesaid Geneva-lock-wheel, and a device connecting the lock-wheel with said oscillating arm to thereby oscillate said arm toward and from the Geneva wheel.

4. An intermittent-movement mechanism comprising a driving-shaft carrying a gear and a pinion, an oscillating arm pivoted on the driving-shaft and carrying a train of gearing in mesh with said pinion, a Geneva pin carried by the terminal gear on said arm, a Geneva wheel adapted to be actuated by said pin, means for oscillating said arm embodying a shaft having a gear in mesh with the aforesaid gear and also carrying a rotary member, and means connecting this rotary member to the free-end of the aforesaid oscillating arm, whereby said arm is oscillated toward and from the Geneva wheel.

In testimony whereof, I have subscribed my name, this 8th day of January, 1926.

VICTOR R. STENGER.